(12) United States Patent
Salazar Lois et al.

(10) Patent No.: US 12,516,628 B2
(45) Date of Patent: Jan. 6, 2026

(54) FUEL NOZZLE/SWIRLER ASSEMBLY FOR A GAS TURBINE ENGINE

(71) Applicant: General Electric Company, Schenectady, NY (US)

(72) Inventors: Gerardo Antonio Salazar Lois, West Chester, OH (US); Hejie Li, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 280 days.

(21) Appl. No.: 18/481,665

(22) Filed: Oct. 5, 2023

(65) Prior Publication Data

US 2025/0116233 A1 Apr. 10, 2025

(51) Int. Cl.
*F02C 7/22* (2006.01)
*F23R 3/28* (2006.01)

(52) U.S. Cl.
CPC ............... *F02C 7/22* (2013.01); *F23R 3/283* (2013.01)

(58) Field of Classification Search
CPC .. F02C 7/22; F23R 3/283; F23R 3/286; F23R 3/14; F23R 3/002; F23R 3/007; F23R 2900/00012; F23R 2900/00017; F23R 2900/03043; F23R 2900/03044
See application file for complete search history.

(56) References Cited

U.S. PATENT DOCUMENTS

| | | | |
|---|---|---|---|
| 4,870,818 A | 10/1989 | Suliga | |
| 7,721,546 B2 | 5/2010 | Fish et al. | |
| 10,317,085 B2 | 6/2019 | Hannwacker et al. | |
| 10,731,859 B2 | 8/2020 | Prociw et al. | |
| 10,816,199 B2 | 10/2020 | Corsmeier | |
| 10,837,640 B2 | 11/2020 | Patel et al. | |
| 11,067,281 B1 | 7/2021 | Garcia et al. | |
| 11,428,410 B2 | 8/2022 | Freeman et al. | |
| 2014/0026580 A1* | 1/2014 | Pardington | F23R 3/60 29/889.22 |
| 2015/0292743 A1* | 10/2015 | Mook | F02C 7/18 29/889.22 |
| 2016/0265780 A1* | 9/2016 | Patel | F23R 3/34 |
| 2017/0363292 A1 | 12/2017 | Morenko et al. | |
| 2020/0025384 A1 | 1/2020 | Patel et al. | |
| 2020/0309373 A1 | 10/2020 | Rabinovich et al. | |

FOREIGN PATENT DOCUMENTS

| | | |
|---|---|---|
| EP | 3211320 A1 | 8/2017 |
| EP | 3296639 A1 | 3/2018 |

* cited by examiner

*Primary Examiner* — Andrew H Nguyen
(74) *Attorney, Agent, or Firm* — Venable LLP; Edward A. Kmett; Michele V. Frank

(57) ABSTRACT

A fuel nozzle/swirler assembly includes a venturi including a heat shield retaining wall. A backplate is connected to the venturi and includes a plurality of purge orifices extending through the backplate. A ceramic matrix composite (CMC) heat shield includes a heat shield attachment wall engaged between the heat shield retaining wall of the venturi and the backplate, and a seal member is arranged between the backplate and the CMC heat shield. The plurality of purge orifices are arranged between the seal member and the venturi and provide a flow of purge air therethrough to flow through a radial gap. The seal member provides a force against the CMC heat shield to axially engage the heat shield attachment wall of the CMC heat shield against the heat shield retaining wall of the venturi.

20 Claims, 13 Drawing Sheets

FUEL NOZZLE/SWIRLER ASSEMBLY FOR A GAS TURBINE ENGINE

TECHNICAL FIELD

The present disclosure relates to a fuel nozzle/swirler assembly for a gas turbine engine.

BACKGROUND

Some conventional gas turbine engines are known to include a twin annular premixing swirler (TAPS) fuel nozzle/swirler assembly. The TAPS fuel nozzle/swirler assembly generally includes a pilot mixer portion and a main mixer portion arranged annularly about the pilot mixer portion. The pilot mixer portion includes a metallic pilot swirler, a pilot fuel injector, a metallic venturi that is connected to the pilot swirler, a fuel nozzle housing connected to the metallic pilot swirler and to the metallic venturi, and a metallic heat shield connected to a downstream end of the metallic venturi.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
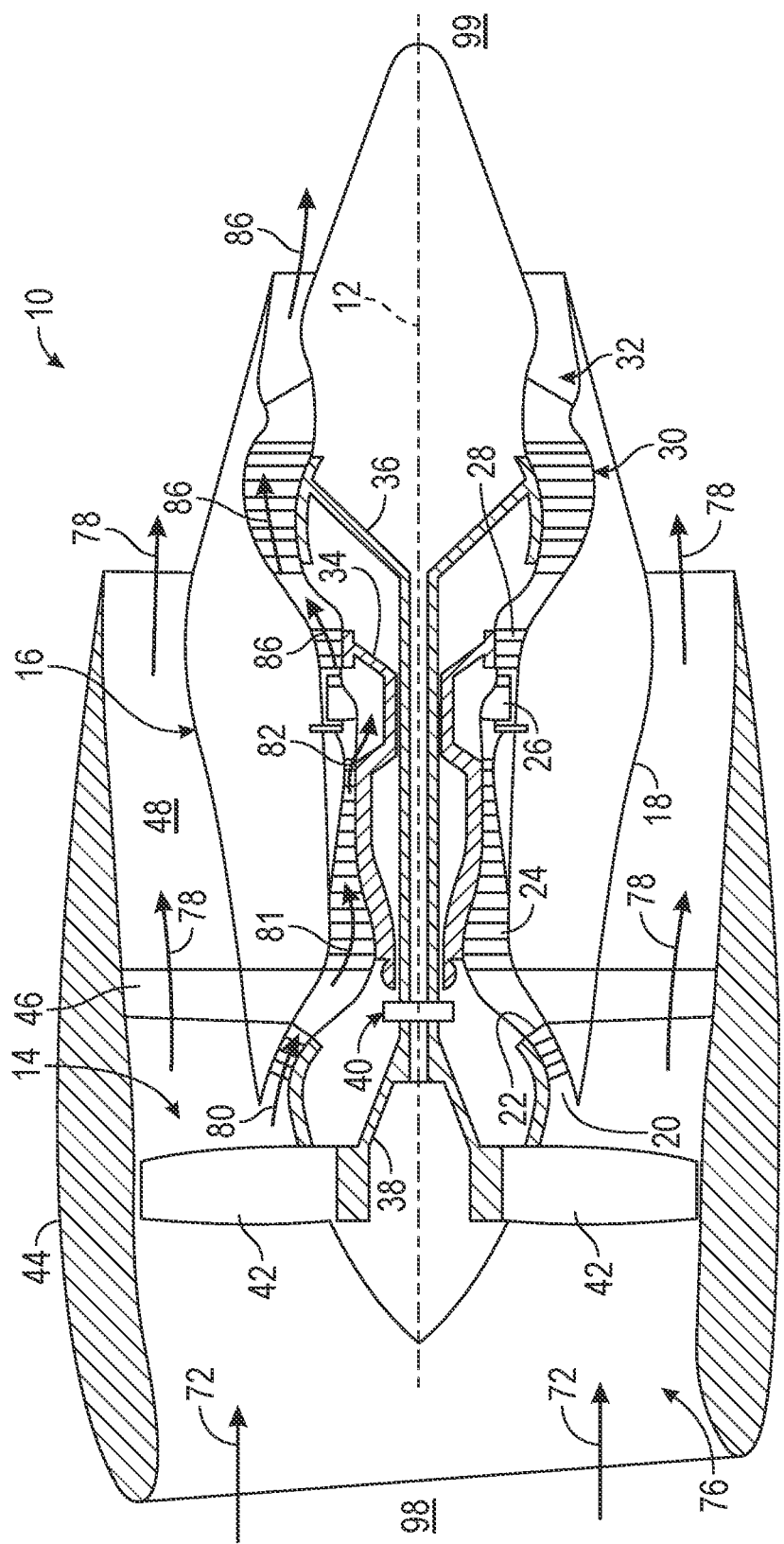
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to a relative side of an element and may be used interchangeably with the terms "upstream" and "downstream," respectively.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the term "metallic" is indicative of a material that includes metal such as, but not limited to, titanium, iron, aluminum, stainless steel, and nickel alloys. A metallic material or alloy can be a combination of at least two or more elements or materials, where at least one is a metal.

As used herein, the term "ceramic matrix composite" ("CMC") refers to a subgroup of composite materials and a subgroup of ceramics. The terms "CMC" and "CMC material" are used interchangeably herein. When the engine component comprises or includes "CMC" or "CMC material," it is understood that the engine component may include one of, or combinations of one or more of the ceramic matrix composite materials described herein. Such engine component may also include non-ceramic matrix composite materials, such as a metal alloy (e.g., a CMC material for an airfoil and separate disk with dovetail slot made from a metal alloy).

More specifically, CMC refers to a class of materials that includes a reinforcing material (e.g., reinforcing fibers) surrounded by a ceramic matrix. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known methods or hereinafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Some conventional gas turbine engines are known to include a twin annular premixing swirler (TAPS) fuel nozzle/swirler assembly. The TAPS fuel nozzle/swirler assembly generally includes a pilot mixer portion and a main mixer portion arranged annularly about the pilot mixer portion. The pilot mixer portion includes a metallic pilot swirler, a pilot fuel injector, a metallic venturi that is connected to the pilot swirler, a fuel nozzle housing connected to the metallic pilot swirler and to the metallic venturi, and a metallic heat shield connected to a downstream end of the metallic venturi. The metallic heat shield is generally arranged on an aft end of the venturi at a combustion chamber side of the fuel nozzle assembly, and is arranged radially between an outlet of the venturi and the fuel nozzle housing so as to provide protection of the fuel nozzle housing from flames and heat of combustion products within the combustion chamber. The metallic venturi, by being subjected to the flames and high temperature of combustion, may tend to deteriorate over time, and require replacement of the heat shield. The replacement of the heat shield can be a cumbersome and an expensive process that requires downtime to repair the engine.

The present disclosure addresses the foregoing by implementing a ceramic matrix composite (CMC) heat shield in a TAPS fuel nozzle/swirler assembly. In particular, the TAPS fuel nozzle/swirler assembly provides an arrangement in which the CMC heat shield is installed between an attachment wall of the venturi and a backplate, and a seal member is arranged within the backplate to apply an axial force against the CMC heat shield so as to hold the CMC heat shield axially, while allowing radial and circumferential expansion between the CMC heat shield, the metallic backplate, and the venturi. In addition, the backplate includes purge orifices arranged between the venturi and the seal member, and a radial gap is provided between the CMC heat shield and the venturi, so as to allow a flow of purge air from the purge orifices to pass through the radial gap to purge any hot gases that may be ingested between the CMC heat shield, the venturi, and the backplate. As a result, a more durable heat shield can be implemented that requires less maintenance and fewer times of replacement of the heat shield, while also providing an easier arrangement for replacing the heat shield, if necessary.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type turbine engines such as that shown in FIG. 1, but can be implemented in unducted fan (UDF) type turbine engines which may include a twin annular premixing swirler (TAPS) combustor. As shown in FIG. 1, engine 10 has a longitudinal centerline axis 12 that extends therethrough from an upstream end 98 of the engine 10 to a downstream end 99 of the engine 10 for reference purposes. In general, engine 10 may include a fan assembly 14 and a core engine 16 disposed downstream from the fan assembly 14.

The core engine 16 may generally include an outer casing 18 that defines an annular inlet 20 to the core engine 16. The outer casing 18 encases, or at least partially forms, in serial flow relationship, a booster or a low-pressure (LP) compressor 22, a high-pressure (HP) compressor 24, a combustor 26, an HP turbine 28, an LP turbine 30, and a jet exhaust nozzle 32. An HP rotor shaft 34 drivingly connects the HP turbine 28 to the HP compressor 24. An LP rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gearbox assembly 40, such as in an indirect-drive or a geared-drive configuration. In other embodiments, although not illustrated, the engine 10 may further include an intermediate-pressure (IP) compressor and an IP turbine rotatable with an intermediate-pressure shaft that connects the IP turbine and the IP compressor.

As shown in FIG. 1, the fan assembly 14 includes a plurality of fan blades 42 that are coupled to, and extend radially outwardly from the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 between the nacelle 44 and the outer casing 18.

Figure 2:
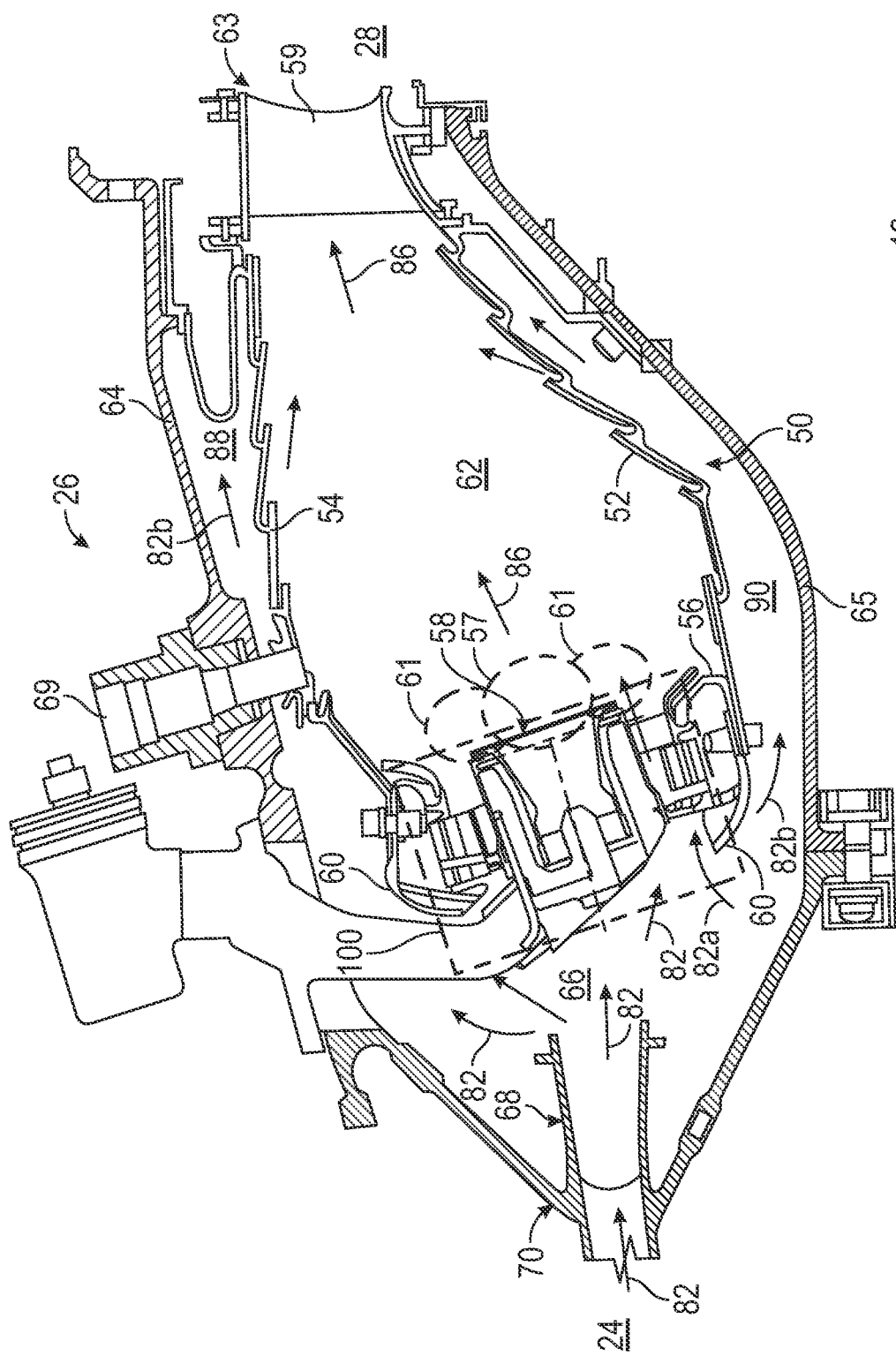
FIG. 2 is a partial cross-sectional side view of an exemplary combustor, according to an aspect of the present disclosure.

FIG. 2 is a cross-sectional side view of the exemplary combustor 26 of the core engine 16 as shown in FIG. 1. FIG. 2 depicts an example of a twin annular pre-mixing swirler (TAPS) type combustor, and is generally an annular combustor that extends circumferentially about the longitudinal centerline axis 12. The combustor 26 includes a cowl 60, and a combustor liner 50, having an inner liner 52 and an outer liner 54. Each of the inner liner 52 and the outer liner 54 is an annular liner that extends circumferentially about the longitudinal centerline axis 12. A dome 56 extends between the inner liner 52 and the outer liner 54. The inner liner 52, the outer liner 54, and the dome 56 together define a combustion chamber 62. In the combustion chamber 62, an initial chemical reaction of an ignited pilot fuel-oxidizer mixture 57 injected into the combustion chamber 62 by a pilot swirler portion (to be described below) of a fuel nozzle/swirler assembly 58 connected to the dome 56 may occur to generate combustion gases 86. In higher power operations of the combustor 26, a main fuel-oxidizer mixture 61 is injected into the combustion chamber 62 by a main swirler portion (to be described below) of the fuel nozzle/swirler assembly 58 to generate combustion gases 86. The combustion gases 86 then flow further downstream into the HP turbine 28 and the LP turbine 30 (FIG. 1) via a turbine nozzle 59 at a downstream end 63 of the combustion chamber 62.

The combustor 26 further includes an outer casing 64 that extends circumferentially about the longitudinal centerline axis 12, and an inner casing 65 that also extends circumferentially about the longitudinal centerline axis 12. An outer flow passage 88 is defined between the outer casing 64 and the outer liner 54, and an inner flow passage 90 is defined between the inner casing 65 and the inner liner 52. The outer casing 64 and the inner casing 65 converge at an upstream end 70 of the combustor 26, and together, define a pressure plenum 66. The outer casing 64 and the inner casing 65 are also connected with a diffuser 68. The diffuser 68 is in flow communication with the HP compressor 24 to receive a flow of compressed air 82 from the high-pressure compressor 24 and to provide the flow of the compressed air 82 into the pressure plenum 66. An ignitor 69 may be connected to the outer casing 64, and extends through the outer flow passage 88 and through the outer liner 54. The ignitor 69 provides an ignition source (e.g., a spark) to ignite the pilot fuel-oxidizer mixture 57. The main fuel-oxidizer mixture 61 may be ignited via the ignited pilot fuel-oxidizer mixture 57, or the ignitor 69 may also be used to ignite the main fuel-oxidizer mixture 61.

Referring back to FIG. 1, in operation, a volume of inlet air 72 enters the nacelle 44 at a nacelle inlet 76, and the inlet air 72 is propelled through the fan assembly 14. A portion of the inlet air 72 propelled by the fan assembly 14 enters the LP compressor 22 as a compressor inlet airflow 80, where it is compressed by the LP compressor 22 to generate compressed air 81. The compressed air 81 then flows to the HP compressor 24, where the compressed air 81 is further compressed to generate compressed air 82. The compressed air 82 from the HP compressor 24 enters the combustor 26 via the diffuser 68 (FIG. 2). Another portion of the inlet air 72 propelled by the fan assembly 14 flows through the bypass airflow passage 48, thereby providing a bypass airflow 78. The bypass airflow 78 provides a majority of the thrust for the engine 10.

Referring back to FIG. 2, as discussed above, the compressed air 82 flows through the diffuser 68, which provides for a reduction in velocity of the compressed air 82 entering the pressure plenum 66, and increases the pressure of the compressed air 82 within the pressure plenum 66. A portion of the compressed air 82 in the pressure plenum 66 enters the cowl 60 (shown schematically as compressed air 82*a*), while another portion of the compressed air 82 passes to the outer flow passage 88 and to the inner flow passage 90 (shown schematically as compressed air 82*b*). The compressed air 82*a* passes through the fuel nozzle/swirler assembly 58 to mix with fuel to generate the pilot fuel-oxidizer mixture 57 and the main fuel-oxidizer mixture 61, both of which are then ignited to generate the combustion gases 86. The compressed air 82*b* in the outer flow passage 88 and in the inner flow passage 90 may be used for various purposes, such as dilution air (not shown) provided to the combustion chamber 62 through dilution openings (not shown) in the inner liner 52 and the outer liner 54, for cooling of the inner liner 52 and the outer liner 54, or for cooling other components of the engine 10.

Referring back to FIG. 1, the combustion gases 86 flow from the combustor 26 to the high-pressure turbine 28, where work is extracted from the combustion gases 86 to rotate the high-pressure turbine 28. The rotation of the high-pressure turbine 28 thereby supports rotation of the high-pressure compressor 24 via the HP rotor shaft 34. The combustion gases 86 then continue to flow downstream of the HP turbine 28 to the LP turbine 30, where additional work is extracted from the combustion gases 86 to rotate the LP turbine 30. The rotation of the LP turbine 30 thereby supports rotation of the LP compressor 22 via the LP rotor shaft 36, and also supports rotation of the fan assembly 14 via the fan shaft 38 connected to the reduction gearbox assembly 40. The remaining combustion gases 86 pass through the jet exhaust nozzle 32 and provide core engine thrust.

Figure 3:
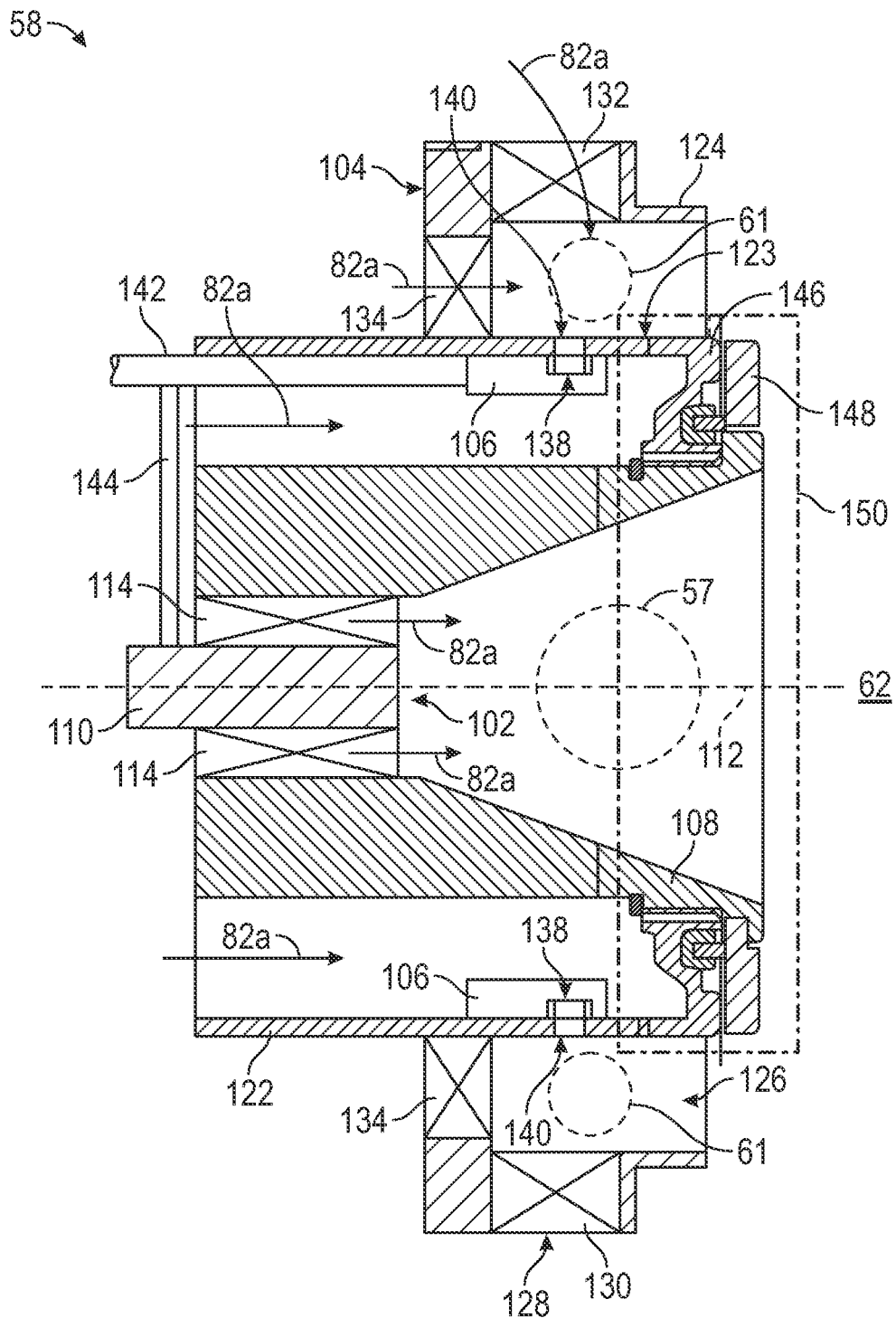
FIG. 3 is an enlarged partial cross-sectional view of a TAPS fuel nozzle/swirler assembly, taken at detail view 100 of FIG. 2, according to an aspect of the present disclosure.

FIG. 3 is an enlarged partial cross-sectional view of the fuel nozzle/swirler assembly 58, taken at detail view 100 of FIG. 2, according to an aspect of the present disclosure. The fuel nozzle/swirler assembly 58 includes a pilot mixer 102, a main mixer 104, and a fuel manifold 106 positioned therebetween. The pilot mixer 102 includes an annular venturi 108 that extends circumferentially about a fuel nozzle centerline axis 112, and a pilot fuel injector 110 mounted within the venturi 108. Further, the pilot mixer 102 includes a first pilot swirler 114 that constitutes a plurality of swirl vanes arranged radially outward of the pilot fuel injector 110. The pilot swirler 114 is generally oriented parallel to the fuel nozzle centerline axis 112, and includes a plurality of vanes for swirling air traveling therethrough. Fuel and air are generally provided to the pilot mixer 102 at all times during the engine operating cycle.

The pilot fuel injector 110 may be a Pure Airblast (PAB) type fuel injector, where pre-filming and atomization of fuel provided thereby is performed almost exclusively by blasting air at the fuel. Fuel is provided by a fuel tube 142 in flow communication with a fuel source (not shown) to a conduit 144 connected with the pilot fuel injector 110. The fuel is injected from the pilot fuel injector 110 into the venturi 108. The pilot fuel-oxidizer mixture 57 (FIG. 2) is then generated within the venturi 108 by mixing the swirling air 82 (a) passing through the pilot mixer 102 and the fuel injected by the pilot fuel injector 110. The pilot fuel-oxidizer mixture 57 is then injected into the combustion chamber 62, where the pilot fuel-oxidizer mixture 57 is ignited and burned to generate the combustion gases 86.

The main mixer 104 is attached to a pilot fuel nozzle housing 122 that surrounds the pilot mixer 102. The main mixer 104 includes an annular main housing 124 radially surrounding the pilot fuel nozzle housing 122, where the main housing 124 defines an annular cavity 126 and a main swirler 128. The main swirler 128 includes a first swirler 130 that is oriented substantially radially to the fuel nozzle centerline axis 112, and includes a plurality of vanes (shown generally) for swirling the compressed air 82a flowing therebetween. The vanes are substantially uniformly spaced circumferentially, and a plurality of substantially uniform passages are defined between adjacent vanes. The main swirler 128 also includes a second swirler 134 oriented substantially parallel to the fuel nozzle centerline axis 112. The second swirler 134 further includes a plurality of vanes (shown generally) for swirling the compressed air 82a flowing therebetween. The vanes of the second swirler 134 are substantially uniformly spaced circumferentially, thereby defining a plurality of substantially uniform passages therebetween.

The fuel manifold 106, as stated above, is located between pilot mixer 102 and main mixer 104, and is in flow communication with a fuel supply (not shown). A plurality of main fuel injectors 138 are provided at the fuel manifold 106, and the pilot fuel nozzle housing 122 includes a plurality of main fuel injector orifices 140 therethrough. The main fuel injectors 138 are arranged to inject fuel through the main fuel injector orifices 140 and into the annular cavity 126 of the main mixer 104. As shown in FIG. 3, the main fuel injectors 138 are preferably positioned so that fuel is provided into the annular cavity 126 downstream of the first swirler 130 and downstream of the second swirler 134. The main fuel-oxidizer mixture 61 (FIG. 2) is generated within the annular cavity 126 by mixing of the compressed air (82a passing through the first swirler 130 and through the second swirler 134 with the fuel injected by the main fuel injectors 138 into the annular cavity 126. The main fuel-oxidizer mixture 61 then flows into the combustion chamber 62, where the main fuel-oxidizer mixture 61 is ignited and burned to generate the combustion gases 86.

Referring still to FIG. 3, a backplate 146 is connected to a downstream end 123 of the pilot fuel nozzle housing 122, and the backplate 146 is connected to the venturi 108. A ceramic matrix composite (CMC) heat shield 148 is also connected to the fuel nozzle/swirler assembly 58 at a downstream side of the backplate 146. The connection of the CMC heat shield 148 to the fuel nozzle/swirler assembly 58 will now be described in more detail.

Figure 4:
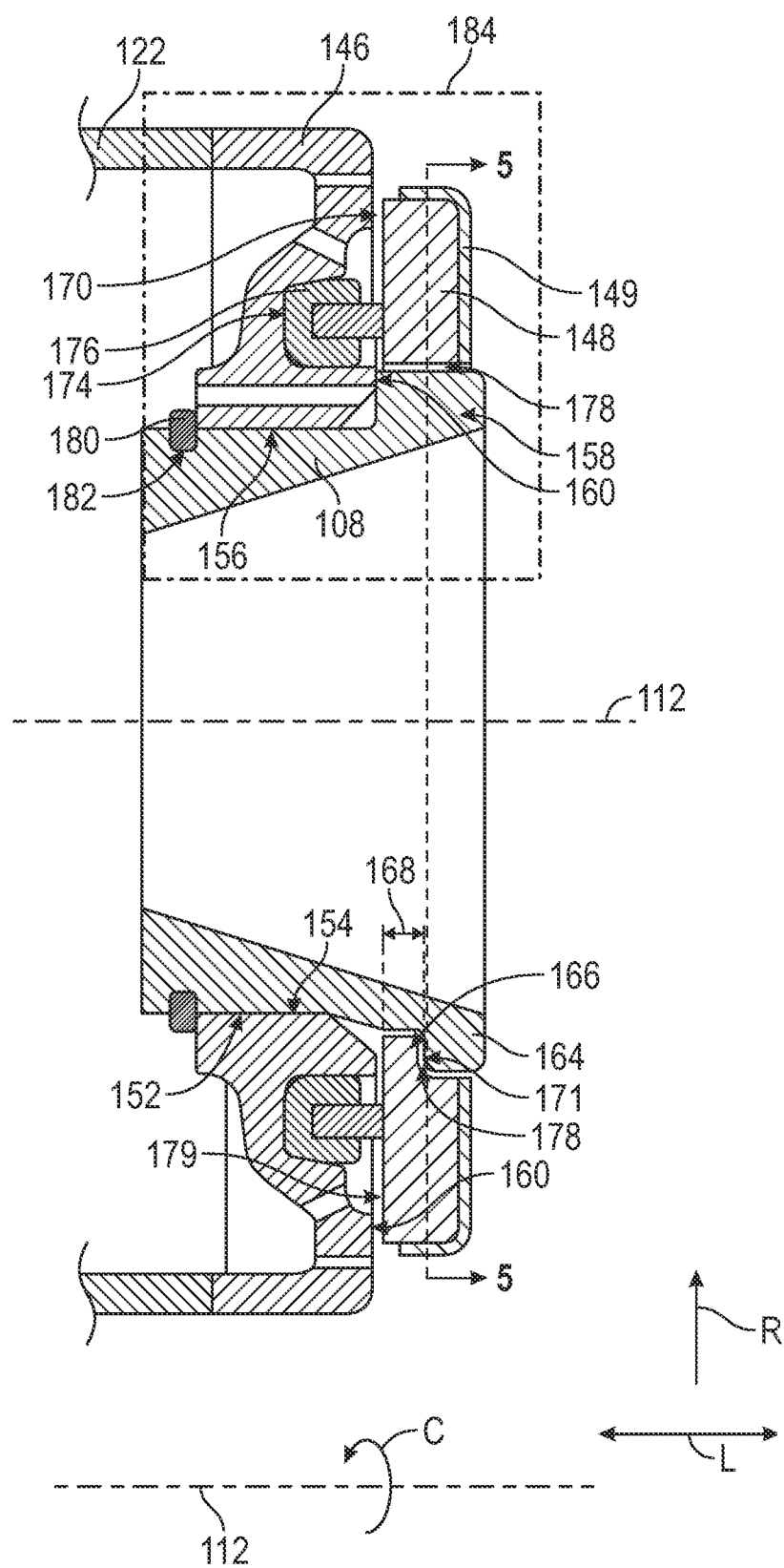
FIG. 4 is an enlarged partial cross-sectional view of a portion of the fuel nozzle/swirler assembly of FIG. 3, taken at detail view 150 of FIG. 3, according to an aspect of the present disclosure.

FIG. 4 is an enlarged partial cross-sectional view of the fuel nozzle/swirler assembly 58, taken at detail view 150 of FIG. 3. FIG. 4 depicts an example arrangement of an assembly of the CMC heat shield 148 with the venturi 108 and the backplate 146. The CMC heat shield 148 may include a protective coating 149 on an aft side of the CMC heat shield 148. As shown in FIG. 4, the venturi 108 includes a backplate connecting surface 152, which may be an outer surface of the venturi 108 that extends circumferentially about the fuel nozzle centerline axis 112. The backplate 146 includes a venturi connecting surface 154, which may be a radially inner surface of the backplate 146 that extends circumferentially about the fuel nozzle centerline axis 112. The backplate 146 is axially installed on the venturi 108 so that an aft side 160 of the backplate 146 butts against clocking tangs 158 (described below), and then, the backplate connecting surface 152 and the venturi connecting surface 154 are brazed together at a brazed joint 156 to connect the backplate 146 to the venturi 108. While the backplate 146 and the venturi 108 may be joined together by being brazed to form the brazed joint 156, an additional level of security may be implemented by attaching a snap ring 180 within a snap ring groove 182 provided in the venturi 108.

The venturi 108 includes a heat shield retaining wall 164 arranged at a downstream end 165 of the venturi 108 that extends circumferentially about the fuel nozzle centerline axis 112. The CMC heat shield 148 has a forward surface 167 and an aft surface 169, and a venturi attachment recess 171 extends into the CMC heat shield 148 from the aft surface 169 and extends circumferentially about the fuel nozzle centerline axis 112. By virtue of the venturi attachment recess 171, CMC heat shield 148 includes a heat shield attachment wall 166 that extends circumferentially about the fuel nozzle centerline axis 112. The venturi attachment recess 171 engages with the heat shield retaining wall 164 of the venturi 108. An axial thickness 168 of the heat shield attachment wall 166 is such that, when the CMC heat shield 148 is assembled onto the venturi 108 prior to forming the brazed joint 156, and the backplate 146 is then assembled onto the venturi 108 to butt against the clocking tangs 158, and the brazed joint 156 is then formed, the heat shield attachment wall 166 is engaged between the heat shield retaining wall 164 of the venturi 108 and the backplate 146 to provide an axial gap 170 between the backplate 146 and the CMC heat shield 148.

Figure 5:
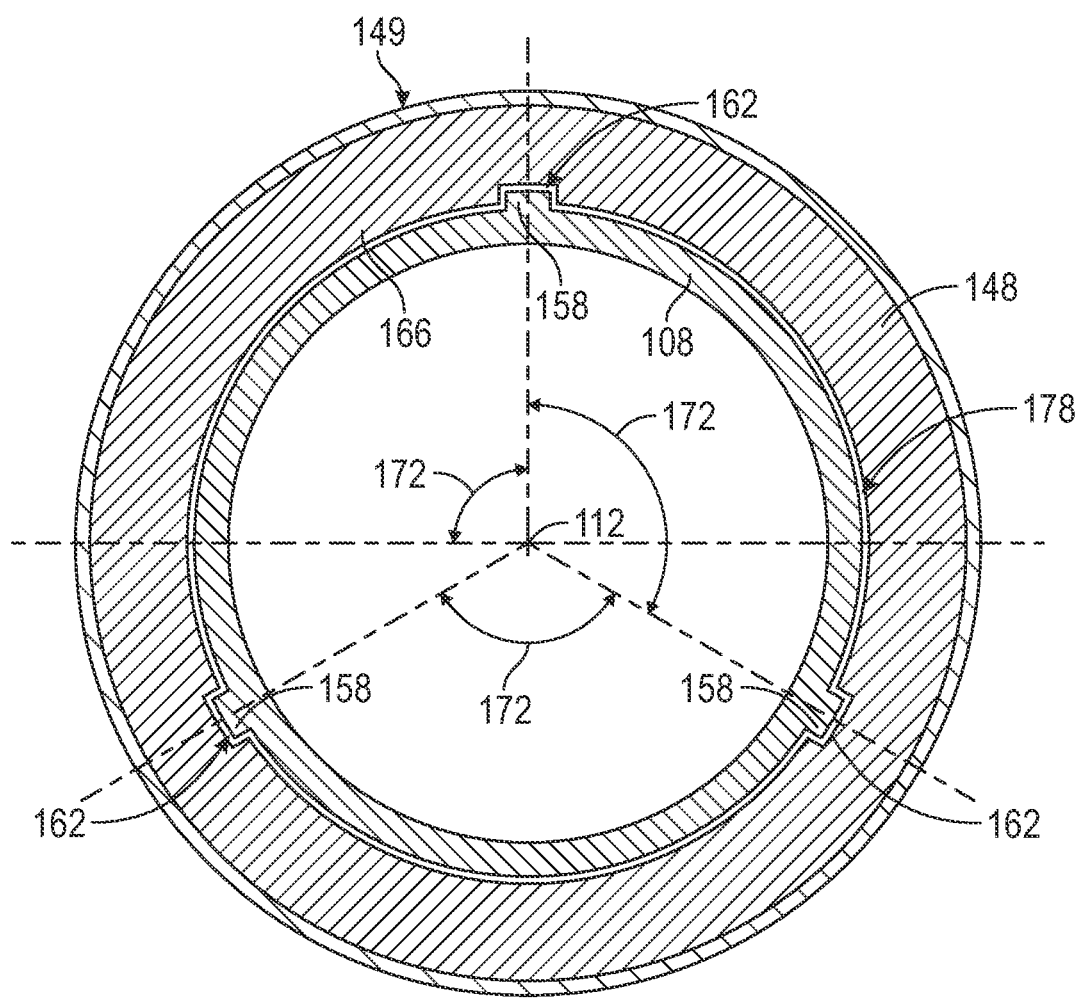
FIG. 5 is a partial cross-sectional view taken at plane 5-5 of FIG. 4 through a CMC heat shield and a venturi, according to an aspect of the present disclosure.

FIG. 5 is a partial cross-sectional view taken at plane 5-5 through the CMC heat shield 148 and the venturi 108. As discussed above, the heat shield retaining wall 164 (FIG. 4) of the venturi 108 includes the clocking tangs 158. As shown in FIG. 5, three clocking tangs 158 are included in the venturi 108, and the three clocking tangs 158 are shown to be circumferentially spaced apart by an angular spacing 172. In FIG. 5, the angular spacing 172 is an equal circumferential spacing about the fuel nozzle centerline axis 112. Of course, the present disclosure is not limited to three clocking tangs 158 and more than three clocking tangs 158 or fewer than three clocking tangs 158 may be included instead. In addition, the clocking tangs 158 need not be equally spaced apart and may be arranged at any unequal angular spacing about the heat shield retaining wall 164.

In FIG. 5, the CMC heat shield 148 is seen to include a corresponding number of clocking grooves 162 that correspond to the number of clocking tangs 158, and that have a corresponding angular spacing 172. The clocking grooves 162 engage with the clocking tangs 158 so as to circumferentially locate the CMC heat shield 148 on the venturi 108. Referring back to FIG. 4, a radial size of a radially outer end of the clocking tangs 158, and a radial size of the clocking grooves 162 is such that a radial gap 178 is provided between the heat shield retaining wall 164 of the venturi 108 and the heat shield attachment wall 166 of the CMC heat shield 148. The radial gap 178 allows for radial adjustment to compensate for different rates of expansion between the CMC heat shield 148 and the metallic venturi 108. In addition, as will be explained in more detail below, the radial gap 178 provides for purging hot gases that may be ingested between the CMC heat shield 148 and the metallic venturi 108.

Referring still to FIG. 4, the backplate 146 includes a seal recess 174 in the aft side 160 of the backplate 146, where the seal recess 174 extends circumferentially about the fuel nozzle centerline axis 112. A seal member 176 is arranged within the seal recess 174. The seal member 176 is configured to provide an axial force in the downstream direction against an upstream side 179 of the CMC heat shield 148. The axial force provides an axial pressure against the upstream side 179 of the CMC heat shield 148 to retain axial engagement between the heat shield attachment wall 166 of the CMC heat shield 148 and the heat shield retaining wall 164 of the venturi 108. The seal member 176 also provides a sealing function to prevent hot gases from being ingested between the venturi 108, the CMC heat shield 148, and the backplate 146. As will be described in more detail below, various types of seal members 176 may be implemented.

Figure 6:
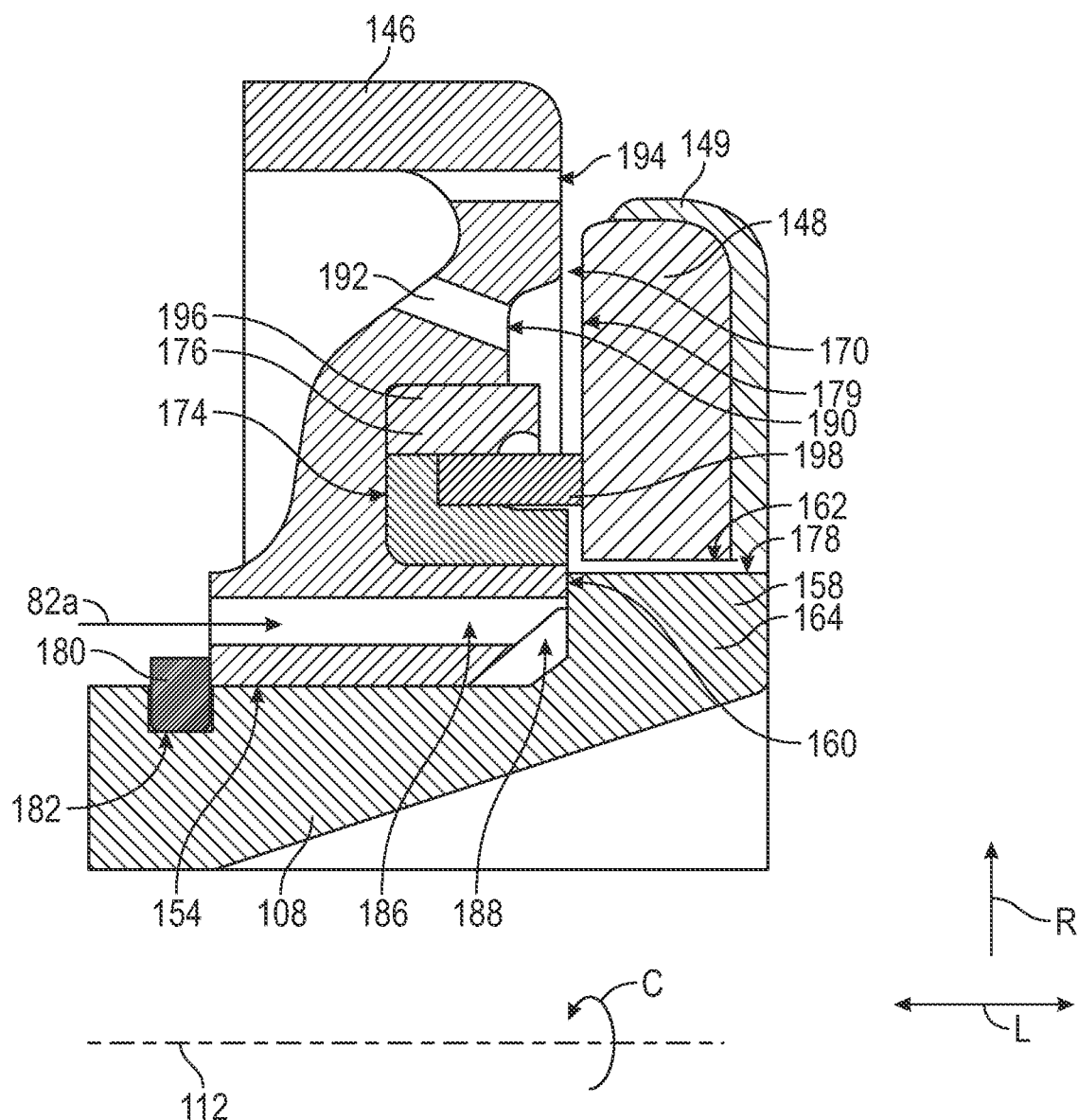
FIG. 6 is an enlarged partial cross-sectional view of a portion of FIG. 4, taken at detail view 184 of FIG. 4, according to an aspect of the present disclosure.

FIG. 6 is an enlarged partial cross-sectional view of a portion of FIG. 4, taken at detail view 184 of FIG. 4, according to an aspect of the present disclosure. In FIG. 6, the backplate 146 is seen to include a plurality of purge orifices 186 (one shown in FIG. 6) extending through the backplate 146. While FIG. 6 depicts one purge orifice 186, a plurality of the purge orifices 186 are provided through the backplate 146 circumferentially spaced apart about the fuel nozzle centerline axis 112. The purge orifices 186 are arranged radially inward of the seal member 176 and radially outward of the venturi connecting surface 154 of the backplate 146. The purge orifices 186 provide a flow of purge air 82c, which is a portion of the compressed air 82a flowing through the fuel nozzle/swirler assembly 58, to a purge cavity 188 that extends circumferentially about the fuel nozzle centerline axis 112. As described above, the aft side 160 of the backplate 146 butts against the clocking tangs 158, but as shown in the lower portion of FIG. 6, where the clocking tangs 158 are not located, a gap is present so that the purge air 82c can flow from the purge cavity 188 and through the radial gap 178 between clocking grooves 162 of the CMC heat shield 148 and the clocking tangs 158 of the heat shield retaining wall 164 so as to purge any hot gases that may be ingested into the radial gap 178 and/or into the purge cavity 188.

In FIG. 6, the backplate 146 also includes a purge flow recess 190 arranged radially outward of the seal recess 174, and a plurality of second purge flow orifices 192 arranged through the backplate 146 to provide a flow of purge air 82d therethrough to the purge flow recess 190. The purge flow recess 190 extends circumferentially about the fuel nozzle centerline axis 112. The flow of purge air 82d flowing through the second purge flow orifices 192 to the purge flow recess 190 can then purge the axial gap 170 of any hot gases that may have been ingested into the axial gap 170 by purging the hot gases radially outward of the axial gap 170. While FIG. 6 depicts one second purge flow orifice 192, a plurality of the second purge flow orifices 192 are arranged through the backplate 146 circumferentially spaced apart to provide the flow of purge air 82d to the purge flow recess 190. In addition, the backplate 146 may include a plurality of cooling airflow orifices 194 arranged through a radially outer end of the backplate 146. The cooling airflow orifices 194 may provide a flow of impingement cooling air 82e to a radial outer side 195 of the CMC heat shield 148. While one cooling airflow orifice 194 is shown in FIG. 6, a plurality of the cooling airflow orifices 194 may be arranged through the backplate 146 and may be circumferentially spaced apart about the fuel nozzle centerline axis 112.

In the FIG. 6 aspect, the seal member 176 is depicted as a brush seal 196 that includes a metallic brush 198, such as wire bristles made of a cobalt superalloy metal that allows bending of the bristles by as much as forty-five degrees. As was discussed above, the seal member 176 provides an axial force against the upstream side 179 of the CMC heat shield 148. When the brush seal 196 is implemented, the bristles of the metallic brush 198 are permitted to bend and to push against the upstream side 179 of the CMC heat shield 148 to provide the axial force. The bristles of the metallic brush 198 also provide a sealing function to prevent hot gases from being ingested radially inward of the seal member 176, and, to prevent the flow of purge air from the purge cavity 188 from flowing radially outward of the seal member 176.

Figure 7:
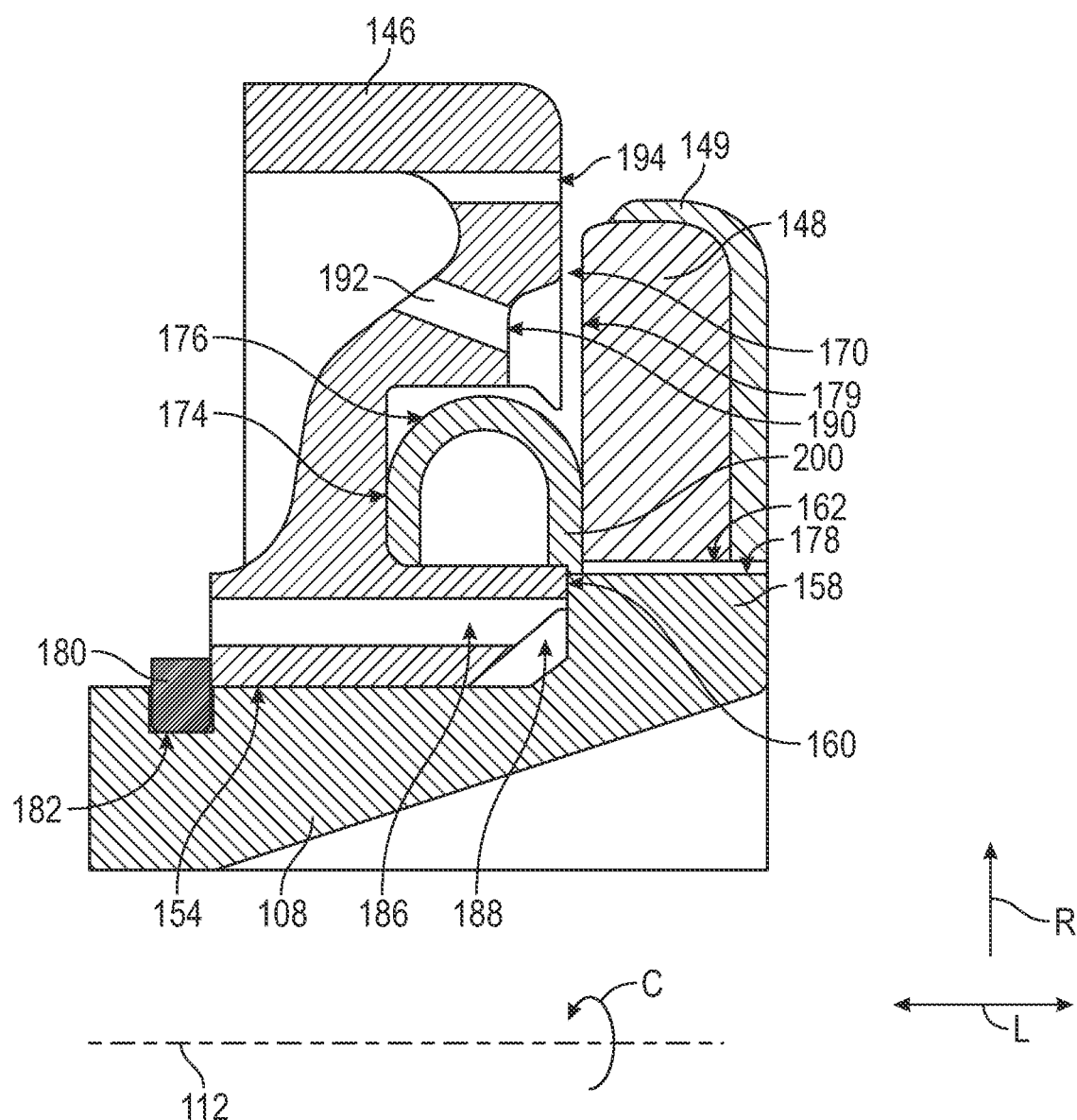
FIG. 7 depicts an enlarged partial cross-sectional view of an alternate arrangement of a seal member to that shown in FIG. 6, according to an aspect of the present disclosure.

FIG. 7 depicts an enlarged partial cross-sectional view of an alternate arrangement of a seal member 176 to that shown in FIG. 6, according to an aspect of the present disclosure. In FIG. 7, component parts that are the same as those of the FIG. 6 aspect have the same reference numerals. The FIG. 7 aspect, however, includes a C-seal 200 instead of the brush seal 196. Similar to the brush seal 196, the C-seal 200 extends circumferentially about the fuel nozzle centerline axis 112. The C-seal 200 may be made of a bendable metallic allow material that, when axially compressed within the seal recess 174 (i.e., compressed in the longitudinal direction L), provides an axial force against the upstream side 179 of the CMC heat shield 148, and, also provides a seal function between the C-seal 200 and the upstream side 179 of the CMC heat shield 148.

Figure 8:
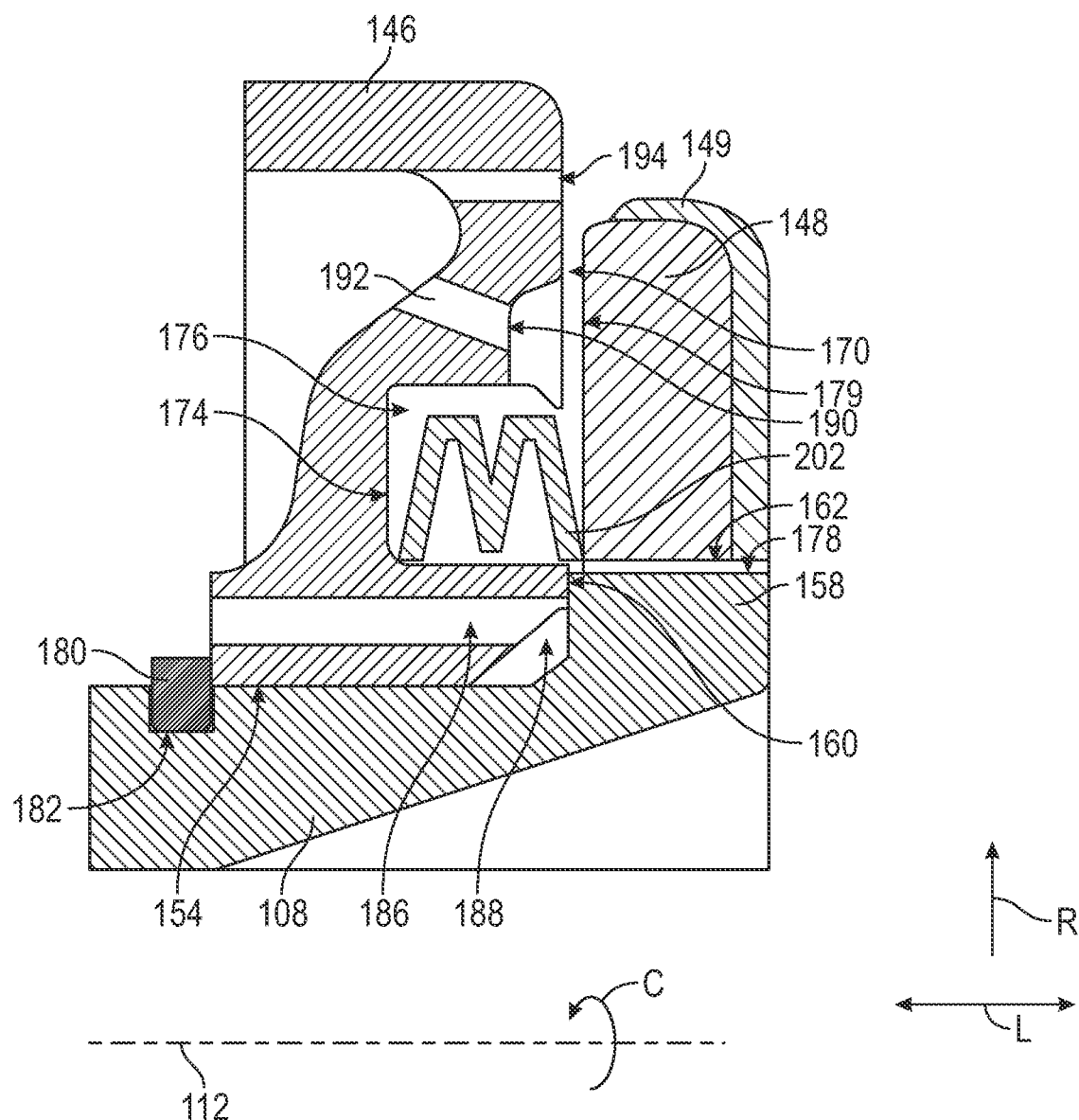
FIG. 8 depicts an enlarged partial cross-sectional view of another alternate arrangement of the seal member to that shown in FIG. 6, according to an aspect of the present disclosure.

FIG. 8 depicts an enlarged partial cross-sectional view of another alternate arrangement of a seal member 176 to that shown in FIG. 6, according to an aspect of the present disclosure. In FIG. 8, component parts that are the same as those of the FIG. 6 aspect have the same reference numerals. The FIG. 8 aspect, however, includes a W-seal 202 instead of the brush seal 196. Similar to the brush seal 196, the W-seal 202 extends circumferentially about the fuel nozzle centerline axis 112. The W-seal 202 may be made of a bendable metallic allow material that, when axially compressed within the seal recess 174 (i.e., compressed in the longitudinal direction L), provides an axial force against the upstream side 179 of the CMC heat shield 148, and also provides a seal function between the W-seal 202 and the upstream side 179 of the CMC heat shield 148.

Figure 9:
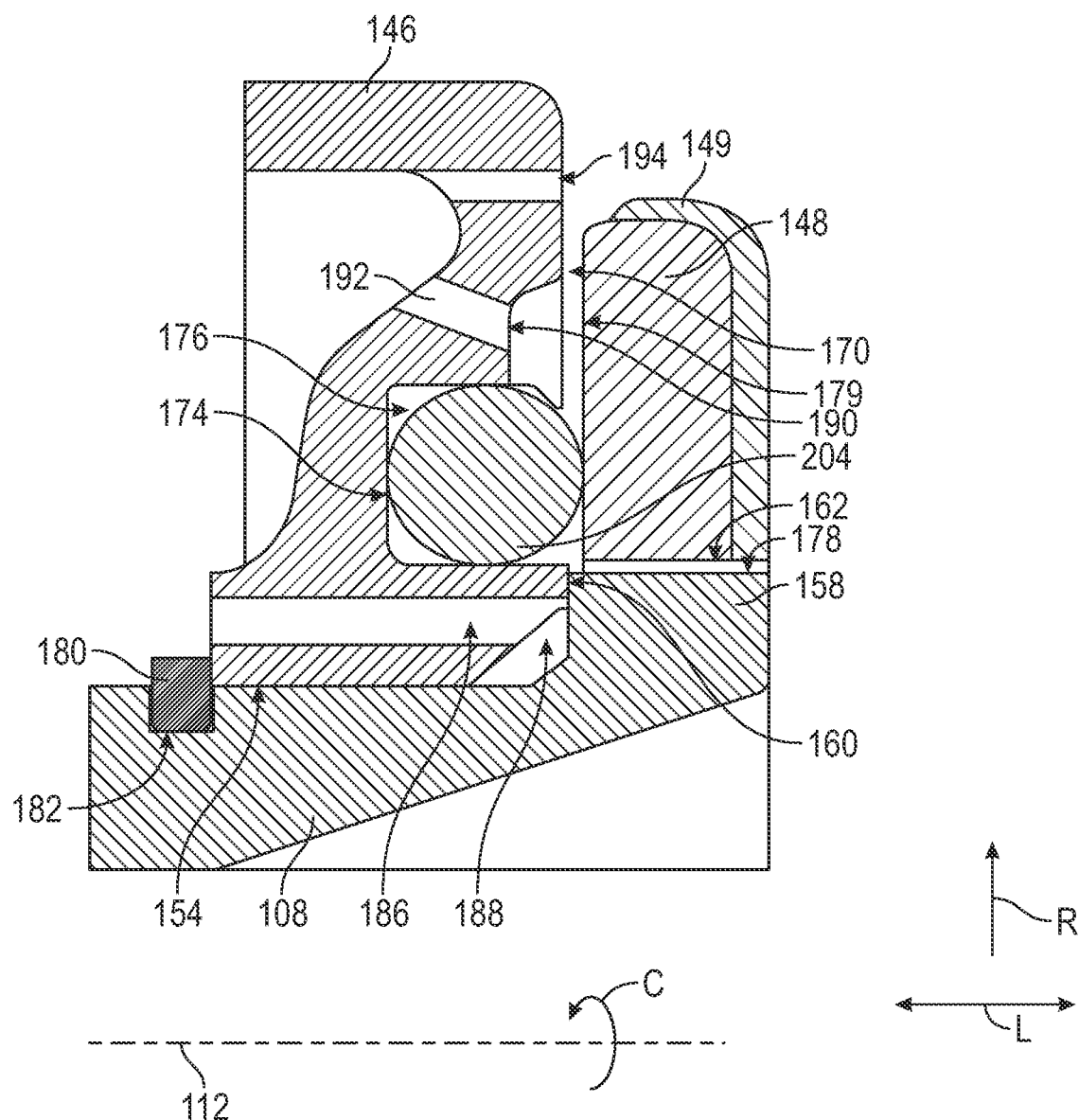
FIG. 9 depicts an enlarged partial cross-sectional view of another alternate arrangement of the seal member to that shown in FIG. 6, according to an aspect of the present disclosure.

FIG. 9 depicts an enlarged partial cross-sectional view of yet another alternate arrangement of a seal member 176 to that shown in FIG. 6, according to another aspect of the present disclosure. In FIG. 9, component parts that are the same as those of the FIG. 6 aspect have the same reference numerals. The FIG. 9 aspect, however, includes a rope seal 204 instead of the brush seal 196. Similar to the brush seal 196, the rope seal 204 extends circumferentially about the fuel nozzle centerline axis 112. The rope seal 204 may be made of a metallic alloy material, or any other material used for providing a seal function, that, when axially compressed within the seal recess 174 (i.e., compressed in the longitudinal direction L), provides an axial force against the upstream side 179 of the CMC heat shield 148, and, also provides a seal function between the rope seal 204 and the upstream side 179 of the CMC heat shield 148.

Figure 10:
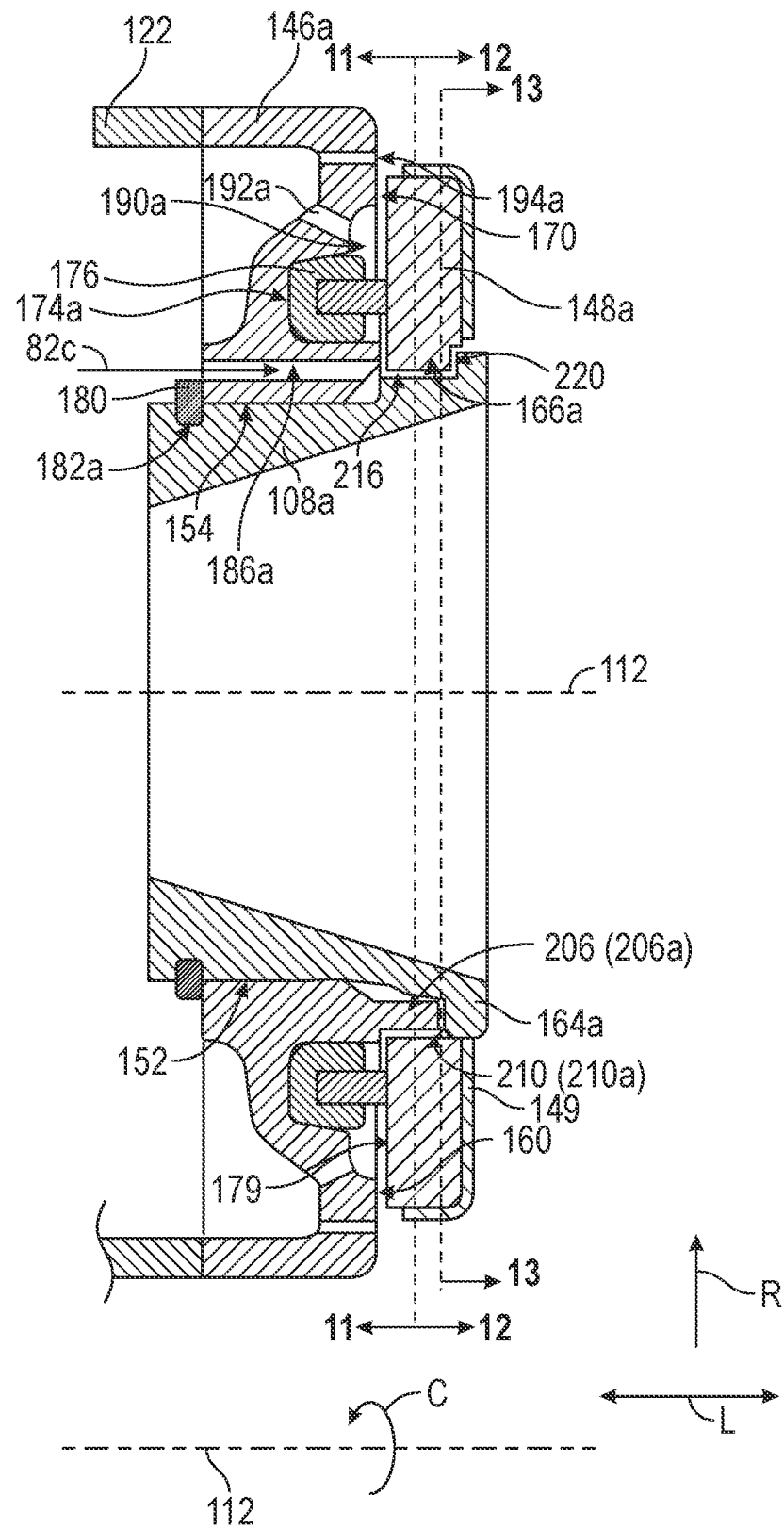
FIG. 10 is a partial cross-sectional view of an alternate arrangement of the fuel nozzle/swirler assembly of FIG. 4, according to an aspect of the present disclosure.
Figure 11:
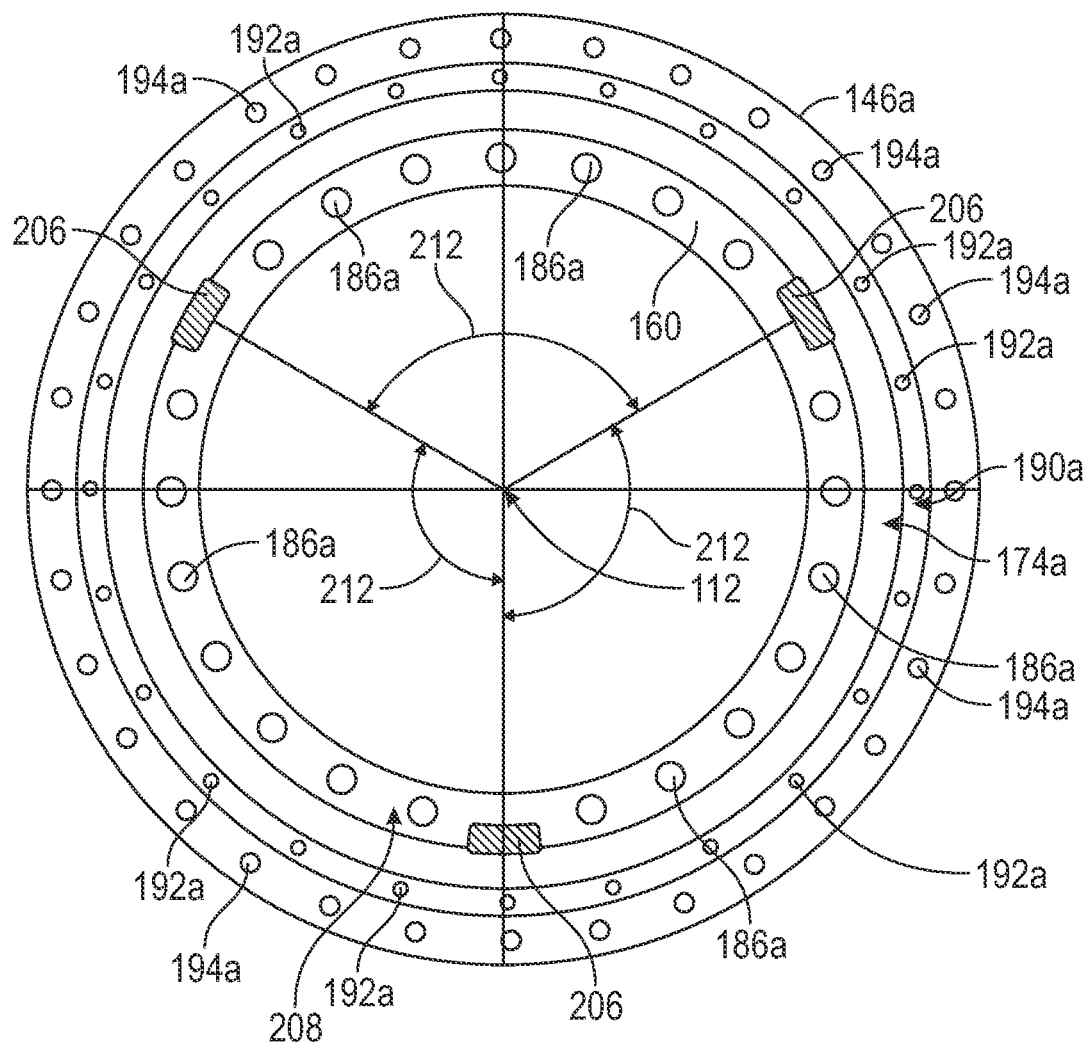
FIG. 11 is an aft, forward-looking partial cross-sectional view of a backplate, taken at plane 11-11 of FIG. 10, according to an aspect of the present disclosure.

FIG. 10 is a partial cross-sectional view of an alternate arrangement of the fuel nozzle/swirler assembly 58 of FIG. 4, according to another aspect of the present disclosure. FIG. 11 is an aft forward-looking partial cross-sectional view of a backplate 146a, taken at plane, generally similar to that of plane 11-11 of FIG. 10, according to an aspect of the present disclosure. In FIG. 11, the cross-sectional view through an alternate CMC heat shield 148a and through an alternate venturi 108a of FIG. 10 is omitted for clarity purposes, and only a cross-sectional view through the alternate backplate 146a is depicted. Referring collectively to FIG. 10 and to FIG. 11, some differences between the FIG. 10 and the FIG. 11 aspect and the FIG. 4 aspect are that a heat shield retaining wall 164a of the alternate venturi 108a of the FIG. 10 and the FIG. 11 aspect does not include the clocking tangs 158 of the venturi 108 in the FIG. 4 aspect, and the alternate CMC heat shield 148a of the FIG. 10 and the FIG. 11 aspect does not include the clocking grooves 162 through the heat shield attachment wall 166 of the FIG. 4 aspect. Rather, in the FIG. 10 and FIG. 11 aspect, the alternate backplate 146a includes a plurality of clocking tangs 206 that extend from a downstream side 208 of the alternate backplate 146a. As shown in FIG. 11, the plurality of clocking tangs 206 may be circumferentially spaced apart from one another about the fuel nozzle centerline axis 112 by an angular spacing 212. While FIG. 11 depicts three clocking tangs 206 that are shown as being equally spaced apart by the angular spacing 212, more than three clocking tangs 206 or fewer than three clocking tangs 206 may be included instead. In addition, the clocking tangs 206 need not be equally spaced apart by the same angular spacing 212, and the clocking tangs 206 may be spaced apart at different angular spacings instead. In addition, while FIG. 10 and FIG. 11 depict the clocking tangs 206 as being integral to the alternate backplate 146a, the clocking tangs 206 may be separate component parts that are assembled to the alternate backplate 146a. For example, the clocking tangs 206 may instead be a separate part that is configured to be inserted into a groove or hole within the alternate backplate 146a (e.g., such as a rectangular-shaped or circular-shaped clocking pin 206a installed into a hole (not shown) in the backplate 148a). The heat shield attachment wall 166a of the CMC heat shield 148a may include a corresponding number of clocking openings 210a that are configured (i.e., sized and arranged circumferentially) to accommodate the clocking pin 206a when the fuel nozzle/swirler assembly 58 is assembled.

The alternate backplate 146a also includes a seal recess 174a, a purge flow recess 190a, a plurality of purge orifices 186a, a plurality of second purge flow orifices 192a, and a plurality of cooling airflow orifices 194a. The seal recess 174a may be the same as the seal recess 174 (FIG. 4), and the purge flow recess 190a may be the same as the purge flow recess 190 (FIG. 4). Similarly, the plurality of purge orifices 186a may be the same as the plurality of purge orifices 186 (FIG. 4), the plurality of second purge flow orifices 192a may be the same as the plurality of second purge flow orifices 192 (FIG. 4), and the plurality of cooling airflow orifices 194a may be the same as the plurality of cooling airflow orifices 194 (FIG. 4). In addition, in the FIG. 10 aspect, any of the seal members 176 described above for aspects of FIG. 6 to FIG. 9 may be implemented within the seal recess 174a.

Figure 12:
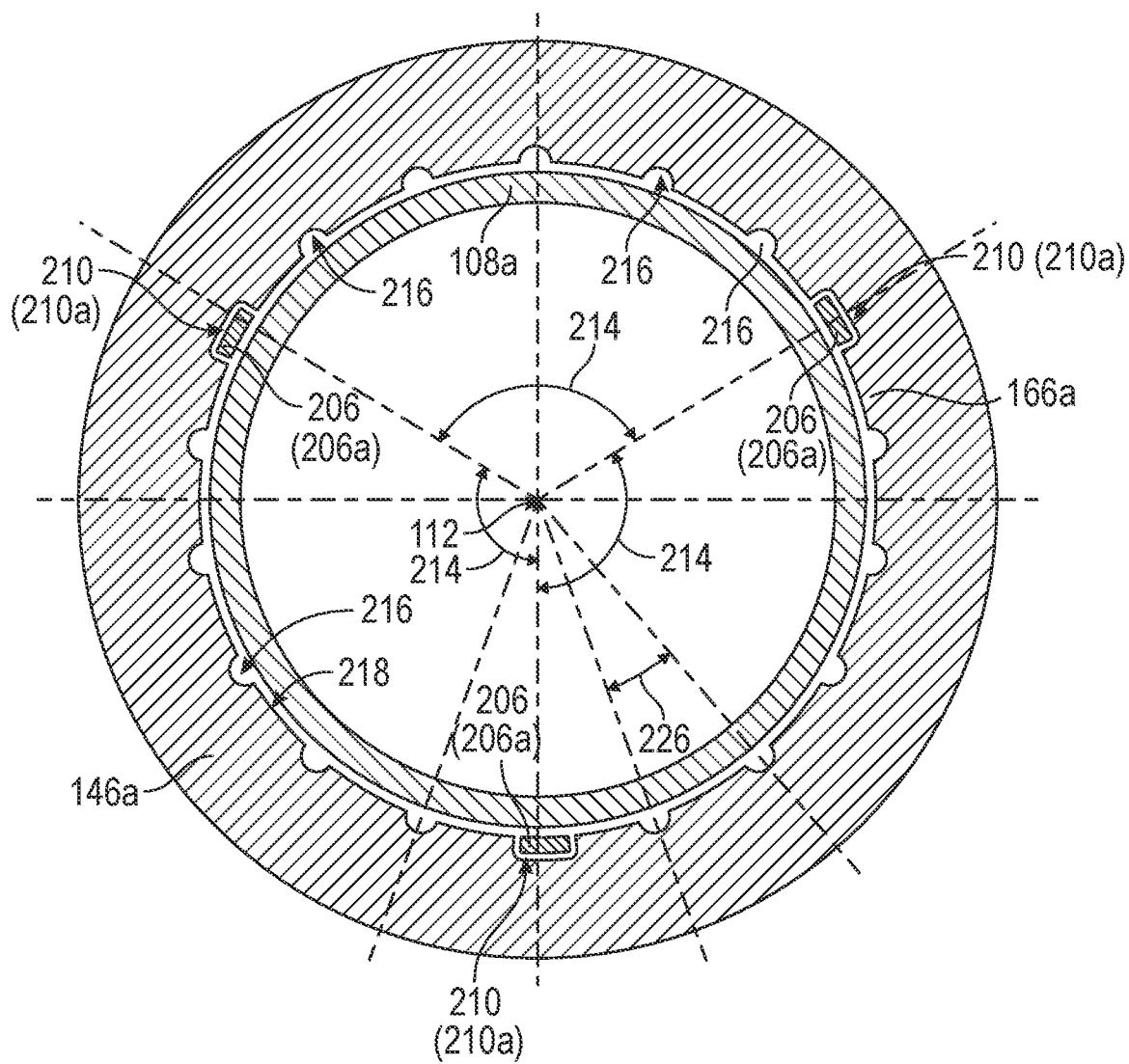
FIG. 12 is a forward, aft-looking partial cross-sectional view through an alternate CMC heat shield, taken at a plane, generally similar to that of plane 12-12 of FIG. 10, according to an aspect of the present disclosure.

FIG. 12 is a forward aft-looking partial cross-sectional view through the alternate CMC heat shield 148a, taken at a plane generally similar to the plane 12-12 of FIG. 10, according to an aspect of the present disclosure. In FIG. 12, the alternate CMC heat shield 148a is seen to include the plurality of clocking grooves 210. The number of the plurality of clocking grooves 210 included in the alternate CMC heat shield 148a is the same as the number of clocking tangs 206 provided in the alternate backplate 146a. Thus, the alternate CMC heat shield 148a of FIG. 12 includes three clocking grooves 210, which are circumferentially spaced apart by an angular spacing 214. The angular spacing 214 of the clocking grooves 210 is the same as the angular spacing 212 of the clocking tangs 206. As shown in FIG. 12, the clocking tangs 206 extend into the clocking grooves 210, and include both a radial clearance and a circumferential clearance with the clocking grooves 210 so as to allow for both radial and circumferential expansion between the metallic alternate backplate 146a and the alternate CMC heat shield 148a.

The alternate CMC heat shield 148a of the FIG. 12 aspect also includes a plurality of axially extending (i.e., extending through the alternate CMC heat shield along the longitudinal direction L) (FIG. 10)) purge flow grooves 216 arranged through a radially inner surface 218 of the alternate heat shield attachment wall 166a of the alternate CMC heat shield 148a. The purge flow grooves 216 are shown in FIG. 12 as having a generally semi-circular cross-sectional shape, but, the purge flow grooves 216 may have any other shape instead, including a rectangular cross-sectional shape, a triangular cross-sectional shape, an oval cross-sectional shape, etc.

Figure 13:
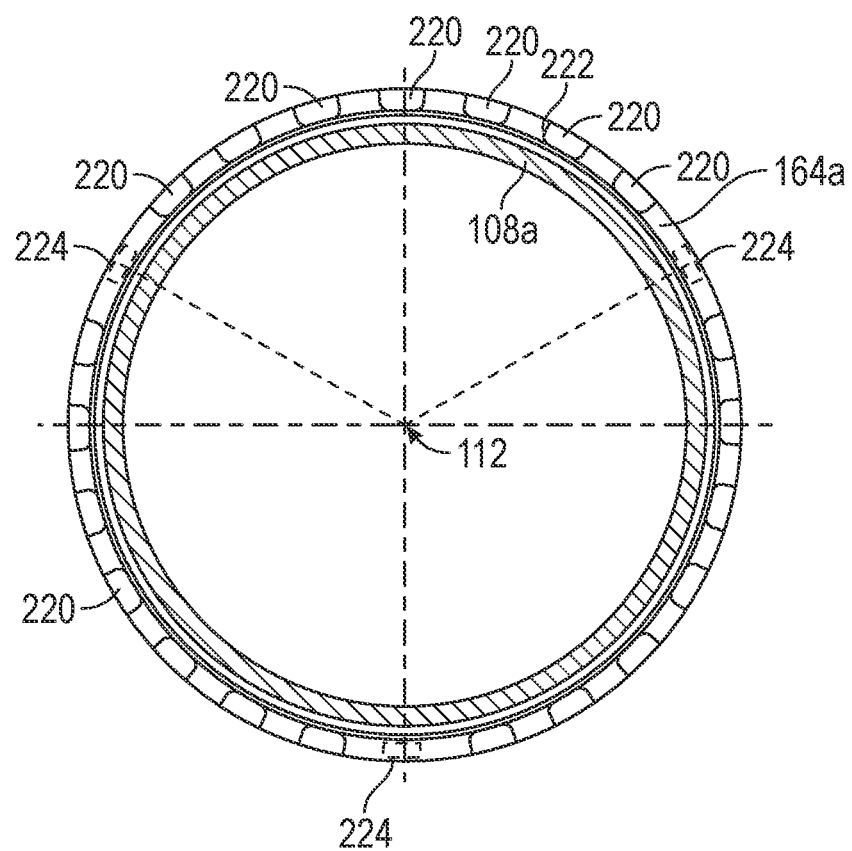
FIG. 13 is a forward, aft-looking partial cross-sectional view through an alternate venturi, taken at a plane, generally similar to that of plane 13-13 of FIG. 10, according to an aspect of the present disclosure.

FIG. 13 is a forward aft-looking partial cross-sectional view through the alternate venturi 108a, taken at plane 13-13 of FIG. 10, according to an aspect of the present disclosure. In FIG. 13, cross-sectional views through the alternate CMC heat shield 148a are omitted for clarity. In FIG. 13, the heat shield retaining wall 164a of the alternate venturi 108a includes a plurality of purge flow grooves 220 through a forward surface 222 of the heat shield retaining wall 164a. The heat shield retaining wall 164a may, however, not include the purge flow grooves 220 in an area (designated as area 224 in FIG. 13) where the clocking grooves 210 (FIG. 10) of the alternate CMC heat shield 148a may be arranged. Otherwise, the plurality of purge flow grooves 220 may be arranged circumferentially spaced apart from one another by an angular spacing 226 about the fuel nozzle centerline axis 112.

Each of the foregoing aspects provides for an arrangement of a TAPS fuel nozzle/swirler assembly that incorporates a CMC heat shield. The CMC heat shield is connected to the fuel nozzle/swirler assembly in such a manner that axial, radial, and circumferential expansion of the metallic components of the fuel nozzle/swirler assembly can be readily accommodated by the CMC heat shield. In addition, the CMC heat shield provides for better durability of the fuel nozzle/swirler assembly since less engine downtime is required because the CMC heat shield does not need to be replaced as often as the metallic heat shield.

Although the foregoing description is directed to some exemplary embodiments of the present disclosure, other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

Further aspects of the present disclosure are provided by the subject matter of the following clauses.

A fuel nozzle/swirler assembly for a combustor of a gas turbine, the fuel nozzle assembly including a venturi including a heat shield retaining wall arranged at a downstream end of the venturi, a backplate connected to the venturi and including a plurality of purge orifices extending through the backplate, a ceramic matrix composite (CMC) heat shield including a heat shield attachment wall engaged between the heat shield retaining wall of the venturi and the backplate, an axial gap being provided between the CMC heat shield and the backplate, and a radial gap being provided between the heat shield attachment wall of the CMC heat shield and the heat shield retaining wall of the venturi, and a seal member arranged between the backplate and the CMC heat shield, wherein the plurality of purge orifices are arranged between the seal member and the venturi and provide a flow of purge air therethrough to flow through the radial gap, and the seal member provides a force against the CMC heat shield to axially engage the heat shield attachment wall of the CMC heat shield against the heat shield retaining wall of the venturi.

The fuel nozzle/swirler assembly according to the preceding clause, wherein the venturi and the backplate are metallic.

The fuel nozzle/swirler assembly according to any preceding clause, wherein the backplate further includes a plurality of cooling airflow orifices therethrough arranged to provide a flow of cooling air to a radially outer side of the CMC heat shield.

The fuel nozzle/swirler assembly according to any preceding clause, wherein the venturi extends circumferentially about a fuel nozzle centerline axis of the fuel nozzle/swirler assembly and includes a backplate connecting surface, and the backplate extends circumferentially about the fuel nozzle centerline axis and includes a venturi connecting surface, the venturi connecting surface being connected with the backplate connecting surface.

The fuel nozzle/swirler assembly according to any preceding clause, wherein the backplate connecting surface and the venturi connecting surface are connected via brazing to form a brazed joint.

The fuel nozzle/swirler assembly according to any preceding clause, further comprising a snap ring, and the venturi includes a snap ring groove, the snap ring being provided in the snap ring groove to retain the backplate.

The fuel nozzle/swirler assembly according to any preceding clause, wherein the backplate further includes a seal recess extending circumferentially about the fuel nozzle centerline axis, the seal member being arranged within the seal recess.

The fuel nozzle/swirler assembly according to any preceding clause, wherein the plurality of purge orifices are arranged radially inward of the seal recess and radially outward of the venturi connecting surface.

The fuel nozzle/swirler assembly according to any preceding clause, wherein the backplate further includes a purge flow recess arranged radially outward of the seal recess, and a plurality of secondary purge flow orifices arranged through the backplate to provide a flow of purge air therethrough to the purge flow recess and to the axial gap between the backplate and the CMC heat shield to purge the axial gap.

The fuel nozzle/swirler assembly according to any preceding clause, wherein the seal member comprises one of a brush seal, a C-seal, a W-seal, or a rope seal.

The fuel nozzle/swirler assembly according to any preceding clause, wherein the CMC heat shield extends circumferentially about a fuel nozzle centerline axis, the CMC heat shield having a forward surface and an aft surface, and including a heat shield attachment wall extending circumferentially about the fuel nozzle centerline axis and having a venturi attachment recess extending into the CMC heat shield from the aft surface.

The fuel nozzle/swirler assembly according to any preceding clause, wherein the venturi attachment recess engages with the heat shield retaining wall.

The fuel nozzle/swirler assembly according to any preceding clause, wherein the heat shield retaining wall includes at least one clocking tang, and the heat shield attachment wall of the CMC heat shield includes at least one clocking groove that engages the at least one clocking tang.

The fuel nozzle/swirler assembly according to any preceding clause, wherein the backplate includes at least one clocking tang extending from a downstream side of the backplate, and the heat shield attachment wall of the CMC heat shield includes at least one clocking groove that engages the at least one clocking tang.

The fuel nozzle/swirler assembly according to any preceding clause, wherein the backplate includes at least one clocking pin extending from a downstream side of the backplate, and the heat shield attachment wall of the CMC heat shield includes at least one clocking opening that engages the at least one clocking pin.

The fuel nozzle/swirler assembly according to any preceding clause, wherein the CMC heat shield includes a plurality of purge flow grooves arranged through a radially inner surface of the heat shield attachment wall.

The fuel nozzle/swirler assembly according to any preceding clause, wherein the heat shield retaining wall of the venturi further includes a plurality of purge flow grooves in a forward surface of the heat shield retaining wall, the forward surface engaging with the heat shield attachment wall of the CMC heat shield.

The fuel nozzle/swirler assembly according to any preceding clause, further including a pilot mixer, and a pilot fuel nozzle housing surrounding the pilot mixer, wherein the venturi is connected to the pilot mixer, and the backplate is connected to a downstream end of the pilot fuel nozzle housing.

The fuel nozzle/swirler assembly according to any preceding clause, further including a main mixer connected radially outward of the pilot fuel nozzle housing.

The fuel nozzle/swirler assembly according to any preceding clause, further including a pilot fuel injector arranged to inject fuel into the pilot mixer, and a plurality of main fuel injectors arranged to inject fuel into the main mixer, wherein the pilot fuel nozzle housing includes a plurality of main fuel injector orifices therethrough and the plurality of main fuel injectors are arranged to inject the fuel through the main fuel injector orifices.

A gas turbine engine including a compressor section, a combustor, and a turbine section in serial flow relationship, the combustor including a combustor liner, a dome assembly, and a plurality of fuel nozzle/swirler assemblies connected to the dome assembly, each of the plurality of fuel nozzle/swirler assemblies including a venturi including a heat shield retaining wall arranged at a downstream end of the venturi, a backplate connected to the venturi and including a plurality of purge orifices extending through the backplate, a ceramic matrix composite (CMC) heat shield including a heat shield attachment wall engaged between the heat shield retaining wall of the venturi and the backplate, an axial gap being provided between the CMC heat shield and the backplate, and a radial gap being provided between the heat shield attachment wall of the CMC heat shield and the heat shield retaining wall of the venturi, and a seal member arranged between the backplate and the CMC heat shield, wherein the plurality of purge orifices are arranged between the seal member and the venturi and provide a flow of purge air therethrough to flow through the radial gap, and the seal member provides a force against the CMC heat shield to axially engage the heat shield attachment wall of the CMC heat shield against the heat shield retaining wall of the venturi.

The gas turbine engine according to the preceding clause, wherein the venturi and the backplate are metallic.

The gas turbine engine according to any preceding clause, wherein the backplate further includes a plurality of cooling airflow orifices therethrough arranged to provide a flow of cooling air to a radially outer side of the CMC heat shield.

The gas turbine engine according to any preceding clause, wherein the venturi extends circumferentially about a fuel nozzle centerline axis of the fuel nozzle/swirler assembly and includes a backplate connecting surface, and the backplate extends circumferentially about the fuel nozzle centerline axis and includes a venturi connecting surface, the venturi connecting surface being connected with the backplate connecting surface.

The gas turbine engine according to any preceding clause, wherein the backplate connecting surface and the venturi connecting surface are connected via brazing to form a brazed joint.

The gas turbine engine according to any preceding clause, wherein the fuel nozzle/swirler assembly further includes a snap ring, and the venturi includes a snap ring groove, the snap ring being provided in the snap ring groove to retain the backplate.

The gas turbine engine according to any preceding clause, wherein the backplate further includes a seal recess extending circumferentially about the fuel nozzle centerline axis, the seal member being arranged within the seal recess.

The gas turbine engine according to any preceding clause, wherein the plurality of purge orifices are arranged radially inward of the seal recess and radially outward of the venturi connecting surface.

The gas turbine engine according to any preceding clause, wherein the backplate further includes a purge flow recess arranged radially outward of the seal recess, and a plurality of secondary purge flow orifices arranged through the backplate to provide a flow of purge air therethrough to the purge flow recess and to the axial gap between the backplate and the CMC heat shield to purge the axial gap.

The gas turbine engine according to any preceding clause, wherein the seal member comprises one of a brush seal, a C-seal, a W-seal, or a rope seal.

The gas turbine engine according to any preceding clause, wherein the CMC heat shield extends circumferentially about a fuel nozzle centerline axis, the CMC heat shield having a forward surface and an aft surface, and including a heat shield attachment wall extending circumferentially about the fuel nozzle centerline axis and having a venturi attachment recess extending into the CMC heat shield from the aft surface.

The gas turbine engine according to any preceding clause, wherein the venturi attachment recess engages with the heat shield retaining wall.

The gas turbine engine according to any preceding clause, wherein the heat shield retaining wall includes at least one clocking tang, and the heat shield attachment wall of the CMC heat shield includes at least one clocking groove that engages the at least one clocking tang.

The gas turbine engine according to any preceding clause, wherein the backplate includes at least one clocking tang extending from a downstream side of the backplate, and the heat shield attachment wall of the CMC heat shield includes at least one clocking groove that engages the at least one clocking tang.

The gas turbine engine according to any preceding clause, wherein the backplate includes at least one clocking pin extending from a downstream side of the backplate, and the heat shield attachment wall of the CMC heat shield includes at least one clocking opening that engages the at least one clocking pin.

The gas turbine engine according to any preceding clause, wherein the CMC heat shield includes a plurality of purge flow grooves arranged through a radially inner surface of the heat shield attachment wall.

The gas turbine engine according to any preceding clause, wherein the heat shield retaining wall of the venturi further includes a plurality of purge flow grooves in a forward surface of the heat shield retaining wall, the forward surface engaging with the heat shield attachment wall of the CMC heat shield.

The gas turbine engine according to any preceding clause, wherein the fuel nozzle/swirler assembly further includes a pilot mixer, and a pilot fuel nozzle housing surrounding the pilot mixer, wherein the venturi is connected to the pilot mixer, and the backplate is connected to a downstream end of the pilot fuel nozzle housing.

The gas turbine engine according to any preceding clause, wherein the fuel nozzle/swirler assembly further includes a main mixer connected radially outward of the pilot fuel nozzle housing.

The gas turbine engine according to any preceding clause, wherein the fuel nozzle/swirler assembly further includes a pilot fuel injector arranged to inject fuel into the pilot mixer, and a plurality of main fuel injectors arranged to inject fuel into the main mixer, wherein the pilot fuel nozzle housing includes a plurality of main fuel injector orifices therethrough and the plurality of main fuel injectors are arranged to inject the fuel through the main fuel injector orifices.

We claim:

1. A fuel nozzle/swirler assembly for a combustor of a gas turbine, the fuel nozzle assembly comprising:
    a venturi including a heat shield retaining wall arranged at a downstream end of the venturi;
    a backplate connected to the venturi and including a plurality of purge orifices extending through the backplate;
    a ceramic matrix composite (CMC) heat shield including a heat shield attachment wall engaged between the heat shield retaining wall of the venturi and the backplate, an axial gap being provided between the CMC heat shield and the backplate, and a radial gap being provided between the heat shield attachment wall of the CMC heat shield and the heat shield retaining wall of the venturi; and
    a seal member arranged between the backplate and the CMC heat shield,
    wherein the plurality of purge orifices are arranged between the seal member and the venturi and provide a flow of purge air therethrough to flow through the radial gap, and the seal member provides a force against the CMC heat shield to axially engage the heat shield attachment wall of the CMC heat shield against the heat shield retaining wall of the venturi.

2. The fuel nozzle/swirler assembly according to claim 1, wherein the venturi and the backplate are metallic.

3. The fuel nozzle/swirler assembly according to claim 1, wherein the backplate further includes a plurality of cooling airflow orifices therethrough arranged to provide a flow of cooling air to a radially outer side of the CMC heat shield.

4. The fuel nozzle/swirler assembly according to claim 1, wherein the venturi extends circumferentially about a fuel nozzle centerline axis of the fuel nozzle/swirler assembly and includes a backplate connecting surface, and the backplate extends circumferentially about the fuel nozzle centerline axis and includes a venturi connecting surface, the venturi connecting surface being connected with the backplate connecting surface.

5. The fuel nozzle/swirler assembly according to claim 4, wherein the backplate connecting surface and the venturi connecting surface are connected via brazing to form a brazed joint.

6. The fuel nozzle/swirler assembly according to claim 4, further comprising a snap ring, and the venturi includes a snap ring groove, the snap ring being provided in the snap ring groove to retain the backplate.

7. The fuel nozzle/swirler assembly according to claim 4, wherein the backplate further includes a seal recess extending circumferentially about the fuel nozzle centerline axis, the seal member being arranged within the seal recess.

8. The fuel nozzle/swirler assembly according to claim 7, wherein the plurality of purge orifices are arranged radially inward of the seal recess and radially outward of the venturi connecting surface.

9. The fuel nozzle/swirler assembly according to claim 7, wherein the backplate further includes a purge flow recess arranged radially outward of the seal recess, and a plurality of secondary purge flow orifices arranged through the backplate to provide a flow of purge air therethrough to the purge flow recess and to the axial gap between the backplate and the CMC heat shield to purge the axial gap.

10. The fuel nozzle/swirler assembly according to claim 7, wherein the seal member comprises one of a brush seal, a C-seal, a W-seal, or a rope seal.

11. The fuel nozzle/swirler assembly according to claim 1, wherein the CMC heat shield extends circumferentially about a fuel nozzle centerline axis, the CMC heat shield having a forward surface and an aft surface, and including a heat shield attachment wall extending circumferentially about the fuel nozzle centerline axis and having a venturi attachment recess extending into the CMC heat shield from the aft surface.

12. The fuel nozzle/swirler assembly according to claim 11, wherein the venturi attachment recess engages with the heat shield retaining wall.

13. The fuel nozzle/swirler assembly according to claim 11, wherein the heat shield retaining wall includes at least one clocking tang, and the heat shield attachment wall of the CMC heat shield includes at least one clocking groove that engages the at least one clocking tang.

14. The fuel nozzle/swirler assembly according to claim 11, wherein the backplate includes at least one clocking tang extending from a downstream side of the backplate, and the heat shield attachment wall of the CMC heat shield includes at least one clocking groove that engages the at least one clocking tang.

15. The fuel nozzle/swirler assembly according to claim 11, wherein the backplate includes at least one clocking pin extending from a downstream side of the backplate, and the heat shield attachment wall of the CMC heat shield includes at least one clocking opening that engages the at least one clocking pin.

16. The fuel nozzle/swirler assembly according to claim 11, wherein the CMC heat shield includes a plurality of purge flow grooves arranged through a radially inner surface of the heat shield attachment wall.

17. The fuel nozzle/swirler assembly according to claim 11, wherein the heat shield retaining wall of the venturi further includes a plurality of purge flow grooves in a forward surface of the heat shield retaining wall, the forward surface engaging with the heat shield attachment wall of the CMC heat shield.

18. The fuel nozzle/swirler assembly according to claim 1, further comprising:
   a pilot mixer; and
   a pilot fuel nozzle housing surrounding the pilot mixer,
   wherein the venturi is connected to the pilot mixer, and the backplate is connected to a downstream end of the pilot fuel nozzle housing.

19. The fuel nozzle/swirler assembly according to claim 18, further comprising a main mixer connected radially outward of the pilot fuel nozzle housing.

20. The fuel nozzle/swirler assembly according to claim 19, further comprising:
   a pilot fuel injector arranged to inject fuel into the pilot mixer; and
   a plurality of main fuel injectors arranged to inject fuel into the main mixer,
   wherein the pilot fuel nozzle housing includes a plurality of main fuel injector orifices therethrough and the plurality of main fuel injectors are arranged to inject the fuel through the main fuel injector orifices.

\* \* \* \* \*